United States Patent Office 3,119,305
Patented Jan. 28, 1964

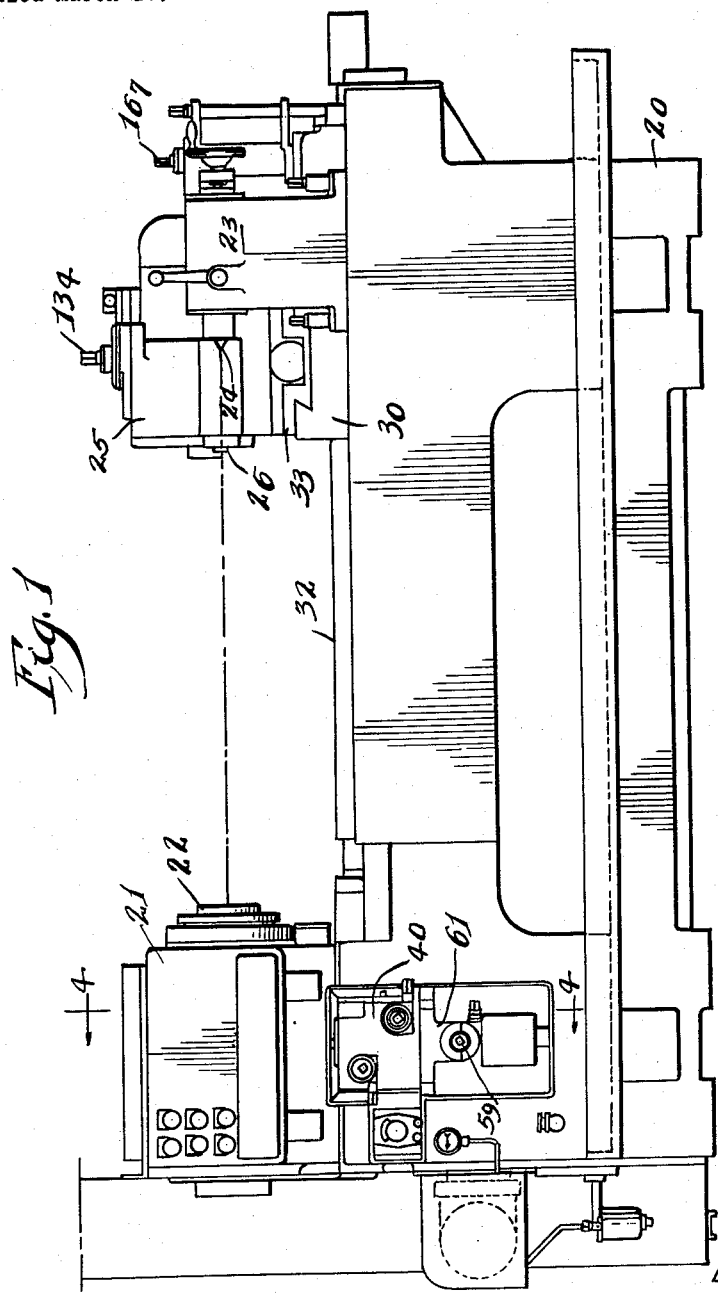

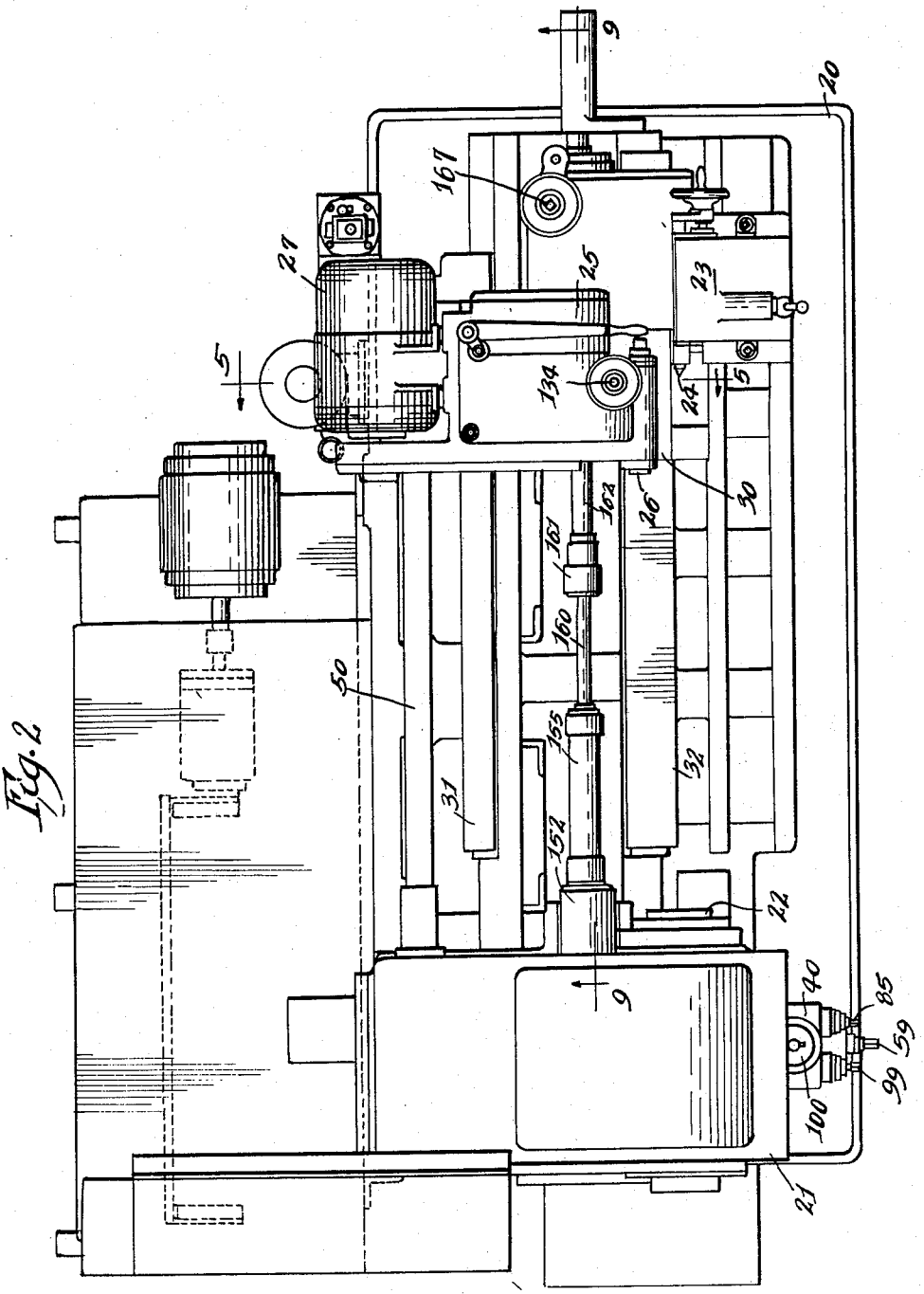

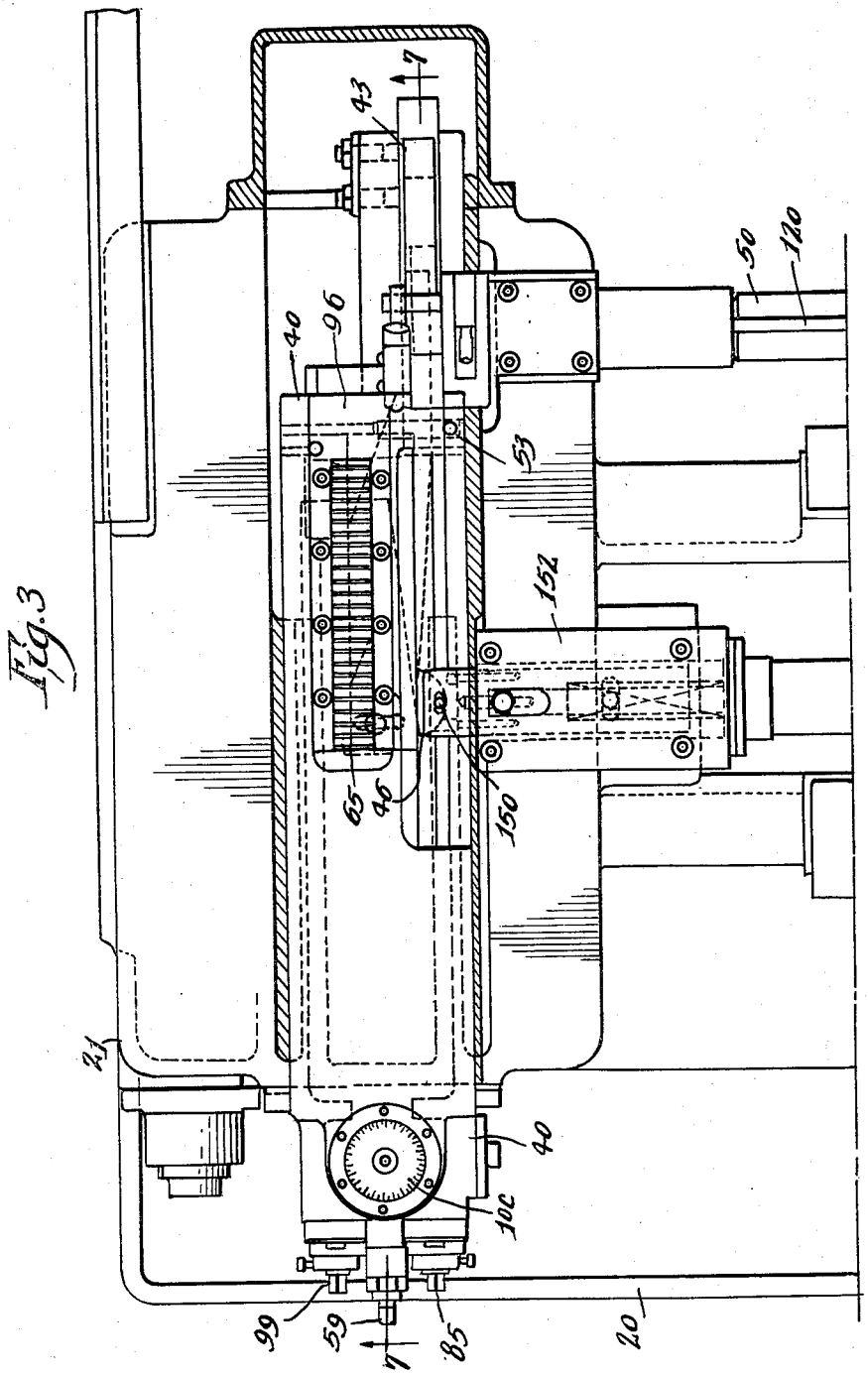

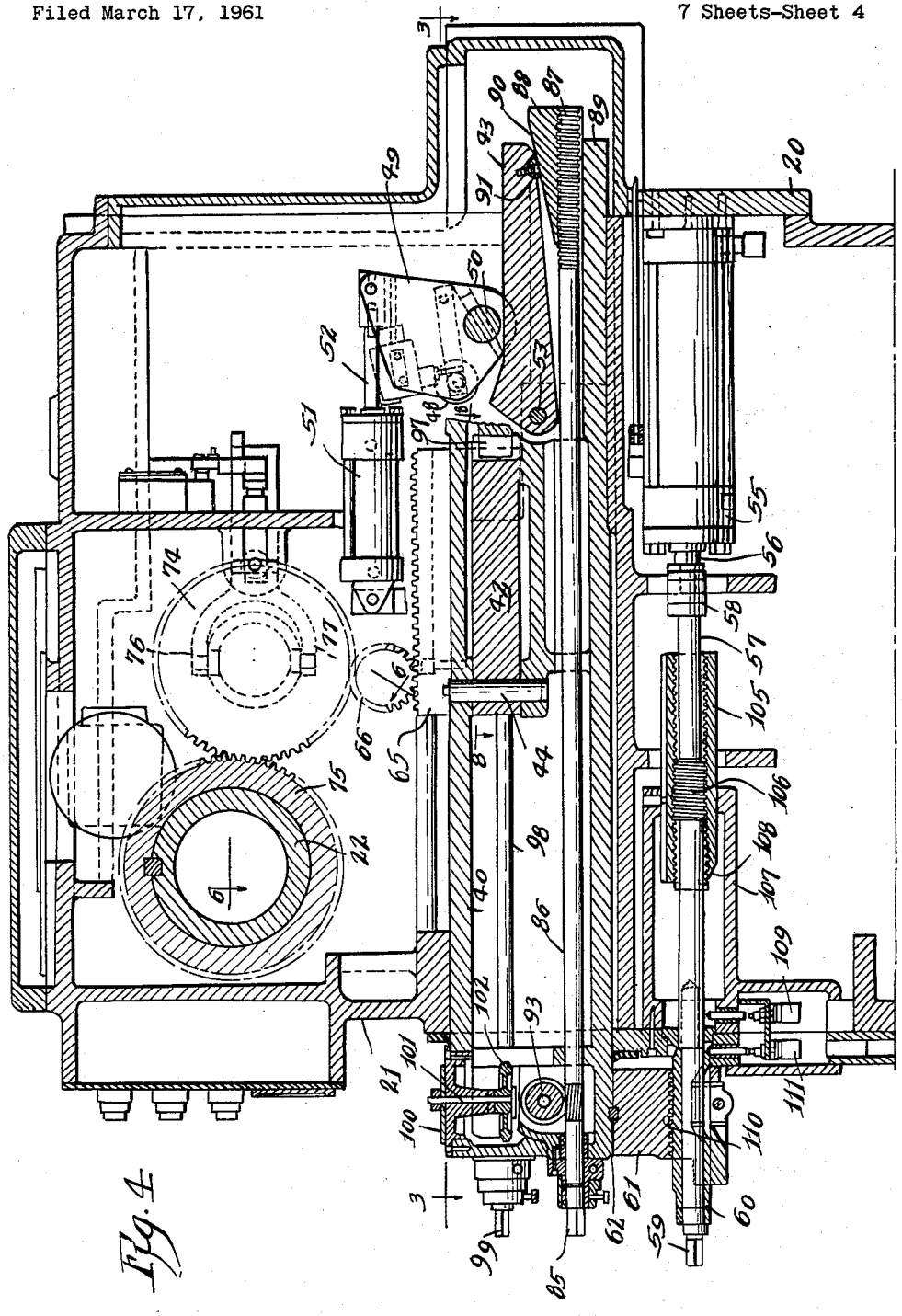

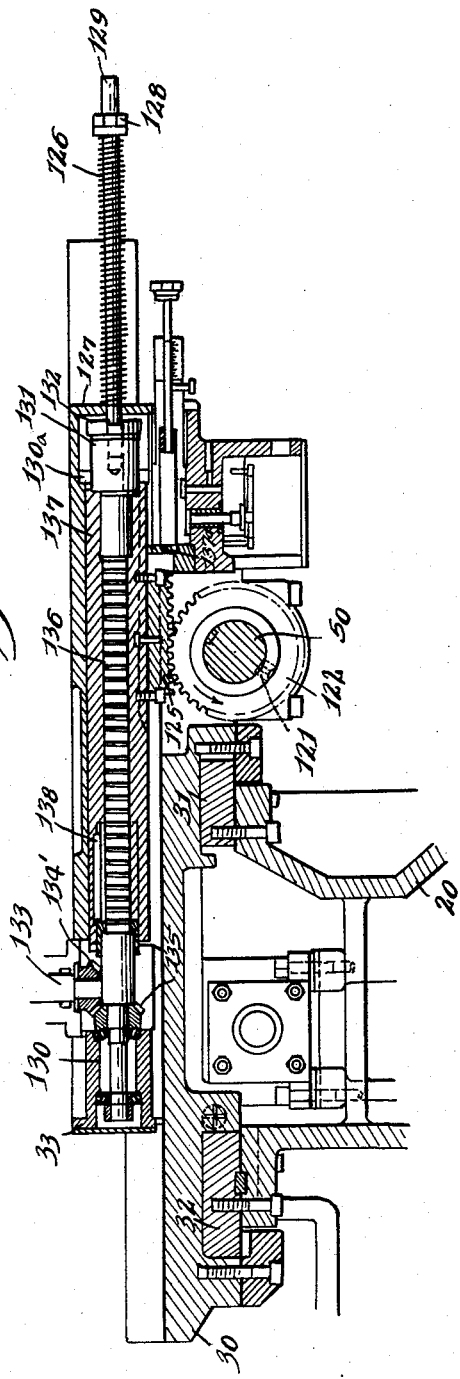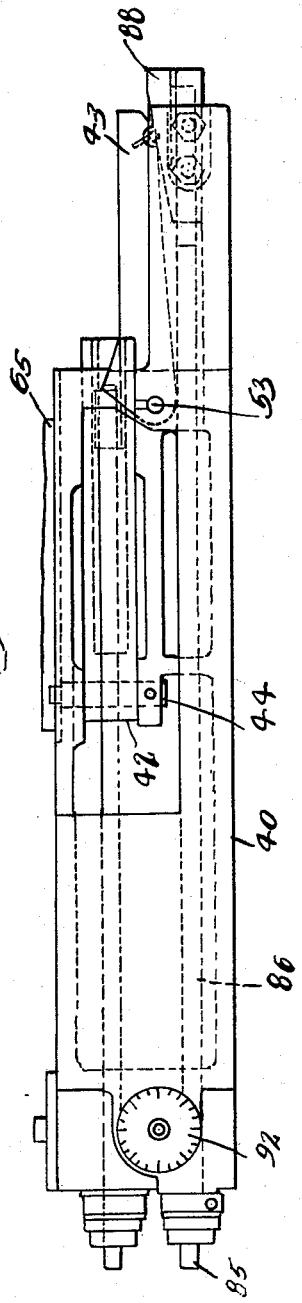

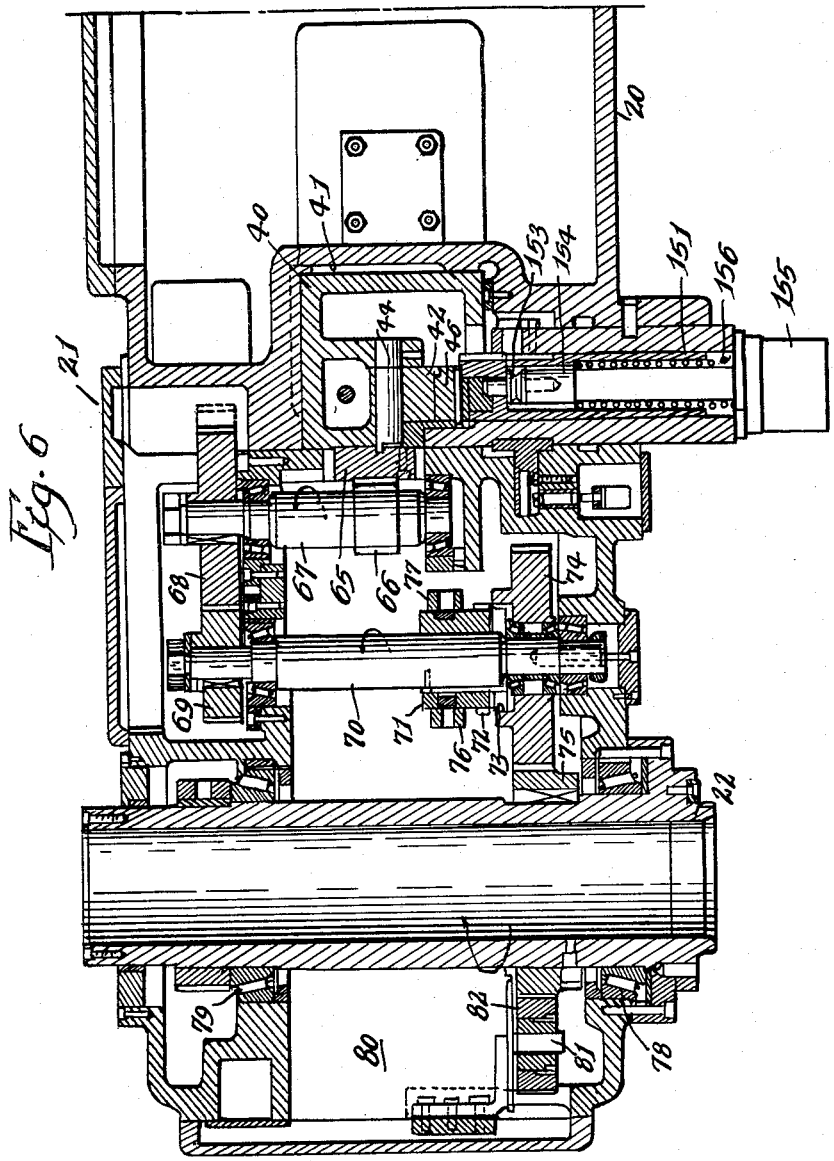

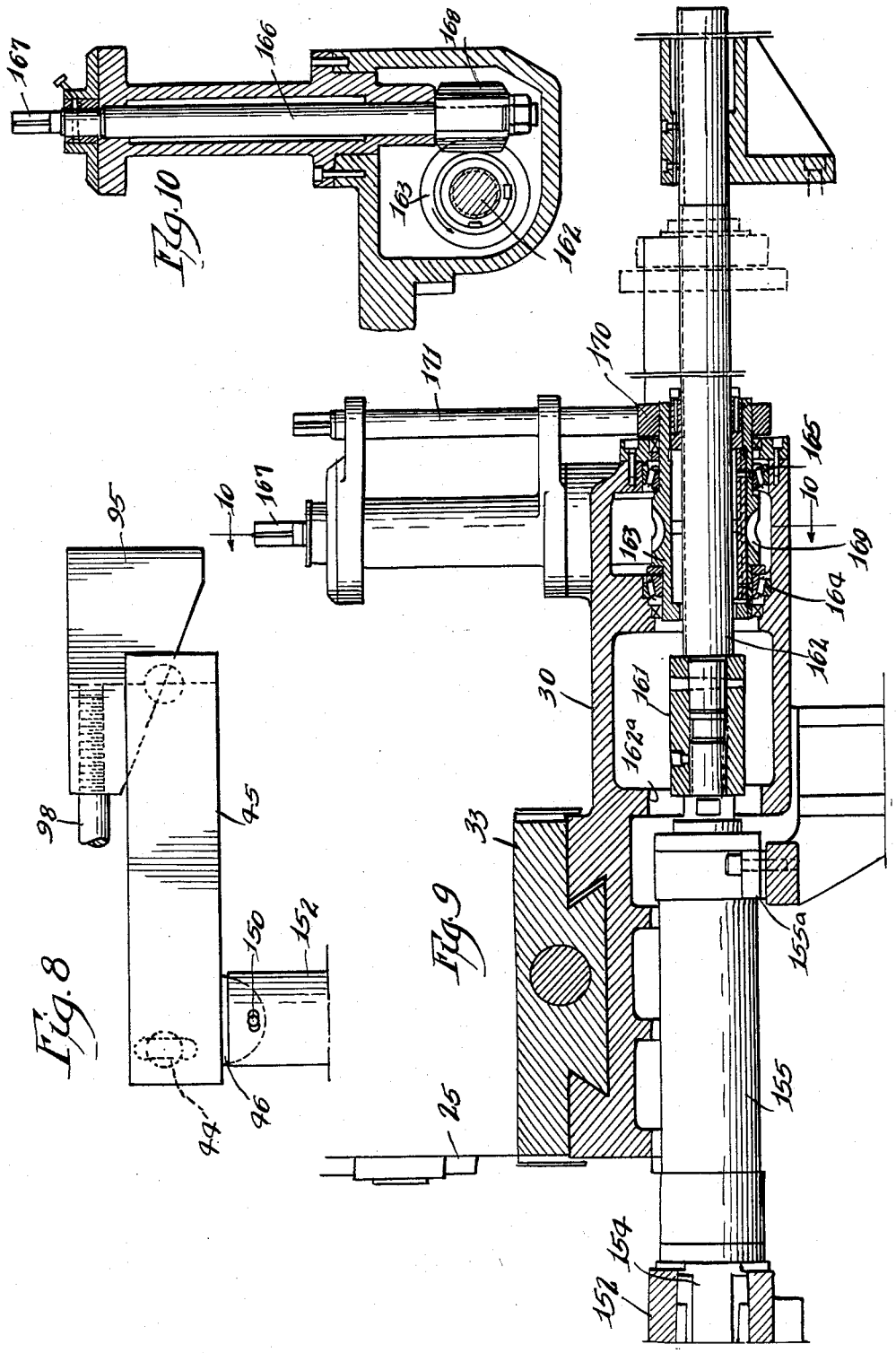

3,119,305
MACHINE TOOL
Lester Chaffee, New Hartford, Conn., and Robert E. Blomquist, Rockford, Ill., assignors to Sundstrand Corporation, a corporation of Illinois
Filed Mar. 17, 1961, Ser. No. 96,542
11 Claims. (Cl. 90—11.62)

This invention relates to a machine tool and more particularly to a thread mill utilizing a sine bar for lead movements of a tool.

An object of this invention is to provide a new and improved thread milling machine.

Another object of this invention is to provide a thread milling machine in which lead and feed movements of a cutter head are controlled from a pair of reciprocably mounted cam members which are moved in timed relation with rotation of a work supporting spindle to cut a thread and in which the cam members may be adjusted to obtain the desired lead and feed by simple adjustment steps.

A further object of the invention is to provide a thread milling machine as defined in the preceding paragraph in which the cam members are mounted on a carrier for reciprocation and a motor operates said carrier with the drive of the spindle being derived from gearing connections to said carrier and said carrier pivotally mounts said cam members whereby remotely operated adjusting means including a wedge block associated with each of said cam members may change the inclination of the cam members to change the lead and feed of the cutter head.

Still another object of the invention is to provide a thread mill comprising a base with a spindle head adjacent one end thereof, a spindle rotatably mounted in said head, a main slide movably mounted on the base adjacent the other end thereof for lead movement in a path extending generally parallel to the axis of the spindle head, a second slide movably mounted on the main slide for feed movement in a path transverse to the spindle axis and adapted to carry a cutter head with a thread milling tool, a sine bar movably mounted on the base for reciprocating movement, a sine bar follower engageable with the sine bar and operatively connected to said main slide whereby longitudinal movement of the sine bar results in lead movement of the main slide, a cam member movably mounted on the base for reciprocation and a follower therefor operatively connected to the second slide to provide feed movement thereof, a carrier movably supporting both the sine bar and the cam member on the base, means for rotating the spindle and shifting the carrier, and means operable from externally of the base for adjusting either the sine bar or the cam member to vary either the lead or feed, respectively.

Still another object of the invention is to provide a thread milling machine as defined in the preceding paragraphs in which a fluid translating device is rotatably connected to said spindle to prevent backlash and gearing connections from the carrier for the cam members to the spindle includes a clutch whereby the clutch may be disengaged and said fluid translating device operated as a motor to rotate said spindle at a rate to permit a facing operation on a workpiece without rechucking thereof.

Other objects and advantages will become readily apparent from the following detailed description taken in connection with the accompanying drawings, in which:

FIG. 1 is a front elevational view of the thread milling machine;

FIG. 2 is a plan view of the thread milling machine shown in FIG. 1;

FIG. 3 is a plan view with parts in section taken generally along the line 3—3 in FIG. 4;

FIG. 4 is a vertical section on an enlarged scale taken generally along the line 4—4 in FIG. 1;

FIG. 5 is a framentary vertical section on an enlarged scale taken generally along the line 5—5 in FIG. 2.

FIG. 6 is a sectional view taken of the spindle head being a layout of the shafts taken generally along the line 6—6 in FIG. 4;

FIG. 7 is a vertical section taken generally along the line 7—7 in FIG. 3 showing the sine bar and second cam member;

FIG. 8 is a fragmentary horizontal section taken generally along the line 8—8 in FIG. 4 showing the sine bar and its adjustment means;

FIG. 9 is a fragmentary vertical section on an enlarged scale taken generally along the line 9—9 in FIG. 2 and with the cutter head shown in an extreme left-hand position; and FIG. 10 is a section taken generally along the line 10—10 in FIG. 9.

As shown generally in FIGS. 1 and 2 the machine tool in the form of a thread milling machine embodies a base 20 having a stationary spindle head 21 at an end thereof with a rotatable spindle 22 mounted therein. A tail stock 23 is mounted adjacent the opposite end of the base and has a tail center 24 which assists the spindle 22 in rotatably supporting a workpiece. A cutter head 25 is movably mounted on the base for lead movement in a direction parallel to the axis of rotation of the workpiece and the axis of the spindle 22 and for feed movement transverse thereto whereby a thread milling tool mounted in a rotatable spindle 26 may perform a thread milling operation on a workpiece. The spindle 26 is driven from a motor 27 through gearing (not shown) in the cutter head 25.

The lead and feed movements for the cutter head 25 are obtained by the mounting of a main slide 30 on ways 31 and 32 extending lengthwise of the base 20 for movement in a lead direction. A second slide or cross slide 33 is movably mounted on the main slide 30 for movement transverse to the path of movement of the main slide 30 and carries the cutter head 25 to provide the feed movement thereof.

The lead and feed movement of the cutter head 25 as derived from movements of the main slide 30 and cross slide 33 are provided by cam members mounted for linear movement on a carrier 40 which is movably mounted in the base 20 for movement along a path extending from front to rear of the machine. The carrier 40 as shown in FIG. 6 is movably mounted within a cavity 41 in the base 20 and slidably confined for movement relative thereto. The carrier 40 carries a first cam member in the form of a sine bar 42 and a second cam member 43 which in the form shown has a contour for taper threading. The sine bar 42 is pivotally mounted on a pin 44 for adjustment about a vertical axis and has a cam surface 45 engageable by a cam follower shoe 46 which depending upon the setting of the cam surface 45 shifts longitudinally of the base 20 as the sine bar moves from rear to front thereof to, through connections hereafter described obtain the lead movement of the cutter head 25. The feed movement of the cutter head 25 is obtained from the cam member 43 with a cam follower roller 48 mounted on a bracket 49 connected to a rotatably mounted shaft 50 supported from and extending lengthwise of the machine base 20. As shown in FIG. 4, the cam follower 48 is out of engagement wtih the cam member 43 as controlled by a hydraulic cylinder 51 mounted within the spindle head 21 and having a rod 52 connected to the bracket 49. The cylinder 51 is of the double-acting type whereby, as shown in FIG. 4, the cam follower 48 is positioned to have the cutter head 25 in its return position. Upon supply of pressure fluid to the opposite end of the cylinder, the cam follower 48 is brought into engagement with the cam 43 and maintenance of pressure at that end of the cylinder causes the cam follower 48 to maintain engagement with the cam member and additionally through the shaft 50 provide the feed movement of the cutter head 25. The cam member 43 is pivotally mounted on the carrier 40 by a horizontally extending pin 53.

Movements of the sine bar 42 and the cam member 43 are obtained by movement of the carrier 40 which is moved by a hydraulic cylinder 55 supported on the base 20 having a piston rod 56 rotatably coupled to a shaft 57 through a coupler 58. The shaft 57 extends to a position outside the base and has an end 59 for rotation of the shaft. The shaft 57 carries a rotatable collar 60 confined against movement lengthwise thereof which is threadably secured to a bracket 61 which is secured to the carrier 40 externally of the base 20 by simple attaching means such as machine screws and which is keyed thereto by a key 62. Thus, as shown in FIG. 4, with the piston rod 56 retracted, the carrier 40 is positioned substantially within the base 20 and upon supply of fluid to the right-hand end of the cylinder 55, the piston rod 56 is extended to shift the carrier 40 outwardly through the connecting bracket 61.

The last-referred to movement of the hydraulic cylinder 55 is utilized to not only shift the cam members 42 and 43, but to also rotate the spindle 22, as shown in FIGS. 4 and 6. The carrier 40 has a rack 65 mounted on the top thereof for movement therewith. The rack 65 through gearing connects with the spindle 22, including a gear 66 on a shaft 67 meshing with the rack. The shaft 67 carries a gear 68 being one of a pair of change gears with the other gear 69 of the pair being mounted on a rotatably mounted shaft 70. The shaft 70 has a driving section 71 of a clutch keyed thereto with teeth 72 selectively engageable wtih teeth 73 on a gear 74 meshing with a gear 75 on the spindle 22. The clutch is normally held in engagement, although shown out of engagement in FIG. 6, whereby shift of the rack 65 results in rotation of the spindle 22. The clutch is caused to be positioned by an operating fork having arms 76 and 77 connected to the driving part 71 of the clutch and controlled by means (not shown) whereby when the clutch is disengaged the spindle may be driven in a different manner as subsequently described.

The spindle 22 is rotatably mounted in the spindle head 21 by means of bearings 78 and 79 and means are provided to prevent backlash. This means comprises a fluid translating device 80 having a shaft 81 gearingly connected to the spindle drive gear 75 by a gear 82. This fluid translating device 80 may suitably be in the form of a vane-type hydraulic motor which is connected in a hydraulic circuit to function normally as a pump when the clutch on shaft 70 is engaged to prevent backlash. When it is desired to perform a facing operation the clutch on shaft 70 is disengaged and the connections to the motor 80 are changed whereby fluid under pressure is supplied thereto to have the motor 80 operate as a motor and through the gear 82 drive the spindle 22 at a desired speed for the facing operation.

Again referring to the carrier 40, the sine bar 42 and cam member 43 may have their operative position adjusted by pivoting thereof about their respective pivots 44 and 53. The adjustment of the cam member 43 is obtained by engagement with a suitable tool of an end 85 of a shaft 86 extending lengthwise of the carrier 40 and held against endwise movement relative thereto, but free to rotate and having a threaded end 87 threadably mounted in a wedge block 88. The wedge block 88 is slidably confined within a part 89 of the carrier 40 and has a slope 90 engageable by a nylon plug 91 whereby as the shaft 86 is rotated linear movement of the wedge block 88 results to correspondingly position the cam member 43. This positioning may be read on a dial 92 (FIG. 7) which is positioned by a shaft 93 (FIG. 6) gearingly connected to the shaft 86.

The pivotal adjustment of the sine bar 42 is obtained by positioning of a wedge block 95 which is slidably confined for movement in a part 96 of the carrier 40 and which engages a nylon plug 97 mounted within the sine bar. The wedge block is threadably connected to a rotatable shaft 98 extending lengthwise of the carrier 40. This shaft is rotatably mounted within the carrier and has an end 99 externally thereof for rotational adjustment of the shaft. The positioning of the sine bar may be read from a lead dial 100 which is mounted on a shaft 101 rotatably driven through a gear 102 on the shaft.

The length of travel of the carrier 40 and thus the number of revolutions of the spindle is adjustable and controlled by the position of a collar 105 (FIG. 4) which is threadably adjustable on a section 106 of the rotatable shaft 57 and keyed against rotation to a tubular part 107 of the machine base 20. An end 108 of the collar coacts with a switch 109 whereby as the hydraulic cylinder 55 operates during a thread milling operation to shift the carrier 40 to the left as viewed in FIG. 4 this movement continues until the leading edge 108 operates the switch 109 to discontinue the supply of fluid to an end of the cylinder 55. Because of this, the location of the collar 105 can be shifted relative to the shaft 57 by rotation of the end 59 thereof to vary the stroke and resultingly the amount of rotation of the spindle 22. The shaft 57 also has associated therewith means for adjusting the depth of feed-in of the cutter head 25 embodying the collar 60 which is threadably secured to the bracket 61 as indicated at 110. This collar coacts with a switch 111 and the position of this collar relative to the carrier 40 can be varied by rotation of the collar 60 to obtain relative movement between this collar and the bracket 61.

The lead and feed movements imparted to the cutter head 25 from the sine bar 42 and cam member 43, respectively, will now be described. Referring first to the feed movement for the cutter head 25, it has been pointed out that the cam follower 48 for the cam member 43 controls rotation of the shaft 50 which is rotatably mounted on the base 20 and extends lengthwise thereof and has a keyway 120 whereby the cross-slide 33 is movable along this shaft. A gear 122 (FIG. 5) rotatably mounted on the main slide 30 may move along the shaft, and is rotatable therewith by a key 121 in the keyway 120. The gear 122 meshes with a rack 125 secured to the underside of cross-slide 33. With rotation of the gear 122 counter-clockwise as viewed in FIG. 5, the cross-slide 33 moves toward the left to feed a cutting tool to the workpiece. Backlash is prevented by a spring 126 positioned between a plate 127 fixed to the main slide 30 and nut means 128 carried at the end of a shaft 129 with this shaft extending lengthwise of the cross-slide 33 and mounted for rotation in bearings 130a. Feed-in control for the cross-slide 33 is obtained by engagement between a fixed member 130 on the main slide surrounding a section 131 of the shaft 129 and engageable by a stop 132 carried on the shaft 129. The position of this stop 132 may be adjusted by rotation of a shaft 133 having an exposed end 134 (FIG. 2) whereby rotation of this shaft through bevel gears 134' and 135 rotates a shaft section 136 which is threaded within a tubular member 137 carrying the part 131 and the stop 132. Rotation of the threaded shaft 136 results in longitudinal shift of the tubular member 137 since rotation of the latter member is prevented by a key 138.

Lead movement of the cutter head 25 is imparted thereto from the sine bar follower shoe 46 by having the shoe pivotally mounted by a pin 150 on a slide 151 (FIG. 6) mounted within a casing 152 on the base 20 and the slide having a pin 153 (FIG. 6) which is engageable with a hardened end of a piston rod 154 positioned within the slide 151 and extending from a hydraulic cylinder 155 fixed to the base at 155a. A spring 156 is positioned within the casing to urge the slide 151 toward the sine bar 42. The cylinder 155 is double-ended with a part 160 extending from the other end thereof which is coupled by a coupling 161 to a threaded shaft 162 extending into the main slide 30.

As shown in FIG. 9, the main slide is in its limit position nearest the spindle head 21 and the coupling 161 has passed into an opening 162a in the main slide. The threaded shaft 162 is threadably engaged by a surrounding collar 163 rotatably mounted within the main slide by bearings 164 and 165 whereby axial movement of the threaded shaft 162 through the collar 163 transmits movement to the main slide as determined by the sine bar 42. The operative position of the main slide 30 relative to the threaded shaft 162 may be adjusted by rotating the collar 163 by a manually operable shaft 166 having an end 167 providing for manual adjustment and a worm gear 168 meshing with a worm wheel 169 on the collar 163. The collar 163 can be locked in position by a brake mechanism 170 operable from a member 171. The hydraulic cylinder 155, when supplied with fluid at the left-hand end thereof as viewed in FIG. 9 moves the main slide to a position adjacent an end of the base 20 and supply of fluid to the other end thereof shifts the slide through a rapid approach movement and causes engagement of the end 154 of the piston rod with the button 153 carried by the shoe slide. The follower shoe 46 is caused to closely follow the sine bar 42 under the urging of the cylinder by the continuous supply of pressure fluid to the right-hand end thereof as viewed in FIG. 9.

In operation with a thread mill carried by the cutter head 25 and rotating, the cylinder 155 is operated to give a rapid approach movement to the cutter head through movement of the main slide 30. The hydraulic cylinder 55 for the carrier 40 is then operated to move the carrier and the cam members supported thereby linearly and at the same time through the rack 65 rotate the spindle 22 carrying a workpiece. The sine bar 42 and the cam member 43 through the parts described cause movement of the cross-slide 33 to produce a feed movement of the tool and movement of the main slide 30 to produce a lead movement. The extent of operation of the cylinder 55 is controlled by the collar 105 engaging the switch 109 to discontinue the supply of hydraulic fluid to the cylinder 55 and at this time the cylinder 51 associated with the cam follower 48 is operated to relieve the tool by rotation of the shaft 50. The movement of the parts are then reversed to return the machine to position awaiting the thread milling of a succeeding workpiece placed in the spindle 22.

We claim:

1. A machine tool comprising, a spindle head having a spindle adapted to rotatably support a workpiece, a tool carrying slide, means mounting said slide for movement in directions both parallel and transverse to the axis of said spindle, means for moving said slide in said two directions including reciprocable cam means having a pair of cam surfaces and a pair of cam followers with one for each cam surface, and a common motor for reciprocating said cam means and rotating said spindle.

2. A machine tool as defined in claim 1 in which said reciprocable cam means includes a sine bar defining one of said cam surfaces to provide lead movement of the slide in the direction parallel to the spindle axis and a second cam member having the other of the cam surfaces to provide feed movement of the slide in the direction transverse to the spindle axis.

3. A machine tool is defined in claim 2 in which said sine bar and second cam member are adjustably mounted, and means operable to adjust one or both to control the lead and feed movements of the slide.

4. A machine tool as defined in claim 1 in which a fluid translating device is rotatably connected to said spindle to prevent backlash and a drive transmission from said motor to the spindle includes a clutch whereby the clutch may be disengaged and said fluid translating device operated as a motor to rotate said spindle at a rate to permit a facing operation on a workpiece without rechucking thereof.

5. A thread mill comprising, a base with a spindle head adjacent one end thereof, a spindle rotatably mounted in said head, a main slide movably mounted on the base adjacent the other end thereof for lead movement in a path extending generally parallel to the axis of the spindle head, a second slide movably mounted on the main slide for feed movement in a path transverse to the spindle axis and adapted to carry a cutter head with a thread milling tool, a sine bar movably mounted on the base for reciprocatory movement, a sine bar follower engageable with the sine bar and operatively connected to said main slide whereby longitudinal movement of the sine bar results in lead movement of the main slide, a cam member movably mounted on the base for reciprocation, a cam member follower operatively connected to said second slide whereby longitudinal movement of the cam member results in feed movement of the second slide, a carrier movably supporting both the sine bar and the cam member on the base, a motor for rotating the spindle and shifting the carrier, and means operable from externally of the base for adjusting either of the sine bar or the cam member to vary either the lead or feed, respectively.

6. A thread mill as defined in claim 5 in which said motor for rotating the spindle and shifting the carrier consists of a fluid piston and cylinder device, connections from said motor to said carrier, and a rack on said carrier gearingly connected to said spindle for rotation of the latter at a controlled rate from the carrier.

7. A thread mill as defined in claim 5 including means pivotally mounting the sine bar and the cam member on the carrier, a pair of wedges associated one with each of the sine bar and cam member, and a pair of adjustment members connected one to each of said wedges and optionally operable to vary the position of the sine bar and the cam member to vary the lead and feed, respectively.

8. A thread mill comprising, a base with a spindle head adjacent one end thereof, a spindle rotatably mounted in said head, a main slide movably mounted on the base adjacent the other end thereof for lead movement in a path extending generally parallel to the axis of the spindle head, a second slide movably mounted on the main slide for feed movement in a path transverse to the spindle axis and adapted to carry a cutter head with a thread milling tool, a carrier mounted generally beneath the spindle head for movement in a path transverse to the spindle axis, a sine bar mounted on said carrier for movement therewith and having a cam surface thereon, a follower engageable against said cam surface, means extending lengthwise of the base connecting said follower with the main slide to obtain lead movement thereof as the sine bar is moved, a reciprocatory motor connected to said carrier, gearing between the carrier and the spindle for rotating the latter in response to movement of the former, means on the carrier including a remotely operated wedge for adjusting the position of the sine bar on the carrier, a cam member on the carrier and a rotatably mounted cam follower therefor, and means extending lengthwise of the base for transmitting and converting rotary movement of the rotatable cam follower to move the second slide linearly in feed movement thereof.

9. A thread mill as defined in claim 8 including a fluid pump gearingly connected to the spindle to prevent backlash.

10. A thread mill comprising, a spindle head having a spindle adapted to rotatably support a workpiece, a tool carrying slide, means mounting said slide for movement in directions both parallel and transverse to the axis of said spindle, means for moving said slide in said two directions including a reciprocable sine bar member and a second cam member, and means for adjusting said sine bar member and second cam member including a pair of wedge blocks associated one with each of said members and a pair of threaded shafts one for each of said wedge blocks for obtaining adjustment thereof.

11. A thread mill comprising, a base with a spindle head adjacent one end thereof, a spindle rotatably mounted in said head, a main slide movably mounted on the base adjacent the other end thereof for lead movement in a path extending generally parallel to the axis of the spindle head, a second slide movably mounted on the main slide for feed movement in a path transverse to the spindle axis and adapted to carry a cutter head with a thread milling tool, a sine bar movably mounted on the base for reciprocatory movement, a sine bar follower engageable with the sine bar, means for connecting the follower to the main slide including a cylinder on the base having a double ended rod with one end adjustably connected to said slide and the other end abutting said sine bar follower whereby longitudinal movement of the sine bar results in lead movement of the main slide, a cam member movably mounted on the base for reciprocation, a cam member follower pivotally mounted on said base, engageable with the cam member, a fluid motor urging the follower into engagement with the cam member and operable to retract the follower from engagement, a shaft rotatably mounted on the base and supporting said cam follower, said second slide being movable along and keyed to said shaft whereby longitudinal movement of the cam member results in feed movement of the second slide, a carrier movably supporting both the sine bar and the cam member on the base, a motor for rotating the spindle and shifting the carrier, means for adjusting the carrier relative to said motor for varying the depth of feed of said second slide, means for controlling the length of carrier movement which determines the amount of spindle rotation and means operable from externally of the base for adjusting either of the sine bar or the cam member to vary either the lead or feed, respectively.

References Cited in the file of this patent
UNITED STATES PATENTS

| | | |
|---|---|---|
| 649,447 | Grime | May 15, 1900 |
| 782,236 | Hanson | Feb. 14, 1905 |
| 2,267,696 | Groene et al. | Dec. 23, 1941 |
| 2,392,752 | Marsilius | Jan. 8, 1946 |
| 2,754,711 | Shapiro et al. | July 17, 1956 |